United States Patent [19]

Horii et al.

[11] Patent Number: 4,523,075
[45] Date of Patent: Jun. 11, 1985

[54] RESISTANCE WELDING APPARATUS

[75] Inventors: Hitoshi Horii; Yutaka Oonishi, both of Tokyo, Japan

[73] Assignee: Tachikawa Spring Co., Ltd., Japan

[21] Appl. No.: 519,312

[22] Filed: Aug. 1, 1983

[30] Foreign Application Priority Data

Jul. 31, 1982 [JP] Japan .............................. 57-116858[U]

[51] Int. Cl.³ .............................................. B23K 11/10
[52] U.S. Cl. .................................... 219/88; 219/86.25; 219/87; 219/78.01
[58] Field of Search ................. 219/78.01, 86.1, 86.24, 219/86.25, 87, 88, 158, 125.1, 86.9, 91.2; 901/41, 42

[56] References Cited

U.S. PATENT DOCUMENTS

| 4,149,059 | 4/1979 | Gött et al. | 219/87 X |
| 4,234,777 | 11/1980 | Balfanz | 219/125.1 |
| 4,323,758 | 4/1982 | Vokurka | 219/125.1 |
| 4,349,718 | 9/1982 | Carota et al. | 219/78.01 |
| 4,404,451 | 9/1983 | Niikawa et al. | 219/161 |

Primary Examiner—Roy N. Envall, Jr.
Assistant Examiner—C. M. Sigda
Attorney, Agent, or Firm—Cushman, Darby & Cushman

[57] ABSTRACT

A resistance welding device includes a base structure having vertically separated ceiling and floor members. The ceiling member includes a first pair of rail members to establish a y-axis and to thereby dependently support a first mounting structure. The first mounting structure in turn includes a second pair of rail members to establish an x-axis and to dependently support a pair of electrode guns therefrom. In such a manner, a matrix configuration of welding points can be welded so as to weld a pair of weldable members to one another.

11 Claims, 4 Drawing Figures

RESISTANCE WELDING APPARATUS

BACKGROUND OF THE INVENTION

1. Field of the Invention

This invention relates to a resistance welding apparatus and in particular to an automatic welding apparatus which is advantageous in that welding operations can be achieved in such a manner that material to be welded will not produce any undesirable "jumping" or oscillatory motions during the welding operation. Also-the present invention ensures that the welding operation can be carried out in such a manner that the materials to be welded will not exhibit any torsional effects.

2. Description of the Prior Art

Conventionally, an automatic resistance welding apparatus is arranged to have an electrode gun which cooperates with another electrode provided at the earth side to grasp superposed metal plates, metal wires, metal tubes or the like to be welded, so that a welding operation is carried out on the contact portions of the mutually superposed materials. Thus, when it is necessary to weld a number of points on the materials, it takes a long time to complete such welding on all of these points since the points must be welded one by one. Also, when the points to be welded are not arranged straight but are scattered, it is necessary to accurately position and positively hold the materials to be welded because they may be caused to jump up or oscillate unexpectedly during welding. Further, when the materials being welded are structurally different from one another, for example, in case of a combination of a plate member with a wire or tube member, concurrent welding is not possible due to the shape of the electrode tip, so that the welding process must be divided into several steps or a plurality of welding facilities are required for one welding cycle, resulting in the increased cost of facilities. In addition, when the material to be welded is a wire of large length, it may be twisted during welding.

SUMMARY OF THE INVENTION

The present invention therefore aims to overcome the disadvantages mentioned above inherent in the prior art. To accomplish this object, the invention provides an improved automatic welding apparatus haing at least two electrode guns, wherein these electrode guns on the one hand are moved in the same direction and on the other hand are move symmetrically in opposing directions simultaneously to allow for the simultaneous welding of materials being welded at two different symmetrical points thereof. Thus, when the materials being welded are products of central symmetry, such as a seat frame of a bench-type seat for a vehicle, the required welding time for all points to be welded can be reduced by one-half, Also, in case of a separate type seat frame two of such seat frames can be welded concurrently to provide for improved productivity. Moreover, the electrodes can be provided with various tips of different configurations as necessary so as to allow welding even for different structural combinations of e.g. a plate member with a wire or tube member, that is, to permit welded-assembly of various kinds of products by only one welding apparatus, whereby advantages such as cost for the equipment can be realized.

BRIEF DESCRIPTION OF THE DRAWINGS

FIG. 1 is a front view of an embodiment of a resistance welding apparatus according to the invention;

FIG. 2 is a side view of the embodiment in FIG. 1;

FIG. 3 is a plan view illustrating the positional relationship between guns employed in the welding apparatus of the present invention; and, FIG. 4 illustrates some examples of shapes of electrode guns tips of the invention.

DETAILED DESCRIPTION OF THE EMBODIMENT OF THE INVENTION

Figures 1, 2, 3, 4:
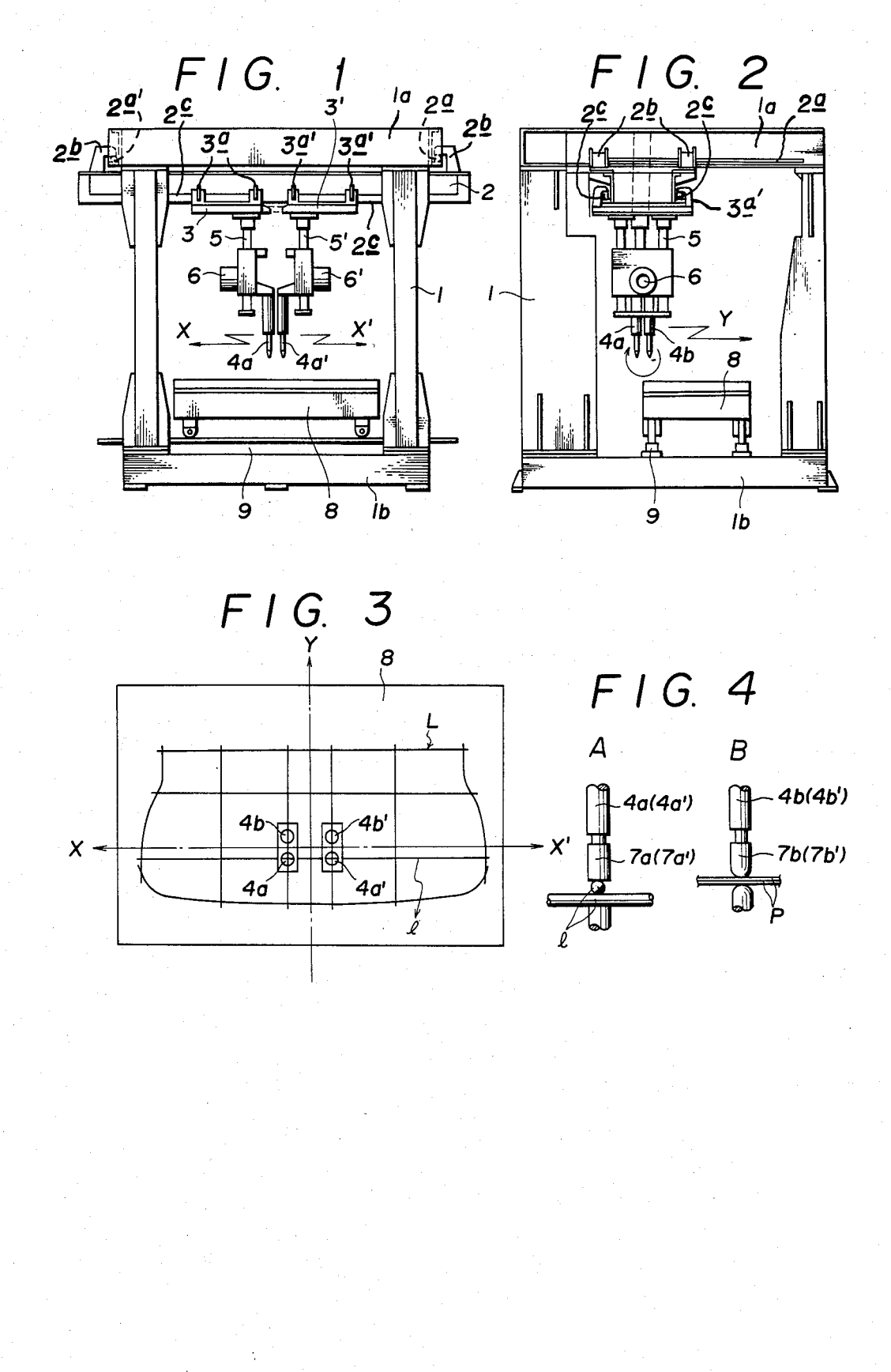

In FIGS. 1 and 2, the reference (1) designates an apparatus base assembly having a ceiling portion (1a). A first elongated moving device (2) is movable back and forth (that is, in the Y direction in the drawings by its mounting to a pair of rails (2a)(2a') disposed at lateral side portions of the ceiling (1a) by means of mounting flanges (2b)(2b')). Two sets of second moving devices (3)(3') are mounted on the moving device (2) so as to be movable right and left (that is, in the X, X' directions in the drawings) by virtue of mounting flanges (3a)(3a') being operatively engaged with rails (2c) of first moving device (2). In such a manner, mounting device (2) is dependantly supported by ceiling (1a) and, in turn, moving devices (3a)(3a') are dependantly supported by moving device (2). The two sets of moving devices (3)(3') are moved in a back-and-forth directions simultaneously and on the other hand they are moved in a right-and-left direction symmetrically away from each other by means of the first moving device (2).

Each of the right and left moving devices (3)(3') is provided with one of two sets of welding electrode guns (4a)(4b), (4a')(4b'), respectively, which are supported by lifting means (5)(5') and swing means (6)(6'). The welding electrode guns (4a)(4a') are provided with tips such as tips suitable for wire members (7a)(7a'), while the electrode guns (4b)(4b') are provided with tips such as tips suitable for plate members (7b)(7b').

Also on the floor portion (1b) of the base assembly (1), there is arranged a jig truck (8) such that it can be movably forwardly and rearwardly into and out of the assembly (1) along a set of rails (9) arranged in parallel relative to the direction of movement of the truck (8).

The operation of the embodiment of the resistance welding apparatus described above will now be explained.

When manufacturing a seat frame of a bench-type seat for vehicle by use of wire members, a wire member L at each point is first positioned relative to the jig truck (8), and while this position is maintained, the jig truck (8) is moved into the floor portion (1b) of the apparatus base assembly (1).

The right and left moving devices (3)(3') are then centrally located at the front side of the positioned member L and the electrode guns (4a)(4a') with the wire-tips (7a)(7a') are positioned so as to correspond to right and left points to be welded in the foremost central portions of the positioned wire member L. With position being maintained, the electrode guns are lowered by means of the lifting means (5)(5') to perform a welding operation at the points and thereafter the right and left moving devices (3)(3') each moved rearwardly by the moving device (2) so that other points located behind the welded points of the positioned wire member L can be welded. In this manner, the central portions of the wire member L are welded sequentially from front to rear in the form of a right and left symmetry. When the wire member has an upwardly bending shape in its rear portions, welding may be performed by tilting the electrode guns by the swing means (6)(6') such that the guns orthogonally confront to the points to be welded.

After completion of the welding operations throughout the central portions of the positioned wire member L, the right and left moving devices (3)(3') are displaced in opposing right and left directions symmetrically away from the center portions so that the electrode guns (4a)(4a') are positioned to match points being welded at both lateral side portions of the wire member. While maintaining this state, the electrode guns, in a similar way as mentioned above, are sequentially moved rearwardly by means of the moving device (2) and are positioned at the respective positions matching to the respective points to be welded so as to provide a proper welding operation.

The welding operations described above are repeated throughout the positioned wire member L a number of times corresponding to the number of points to be welded until the extreme ends of of the side portions have been treated. Consequently, after all points being welded on the wire member have been completely welded, the moving devices (3)(3') are caused to return to their original positions and the jig truck is moved along rails (9) so that the welded product can be removed thereby completing one welding cycle.

When welding a plate member P, the electrode guns (4b)(4b') provided with tips for plate members (7b)(7b') are used to perform a sequential welding operation starting from the central portions to the side portions of the plate member in symmetriacl, right-and-left directions in the same manner as with the welding cycle for the wire member L described hereinbefore.

The operational procedures of both of the welding cycles for the wire and plate members mentioned above are stored in a computer incorporated within a control unit, so that such welding operations can be automatically controlled.

With the above arrangement of the invention, the electrode guns can be provided with various tips having different shapes selectable based on materials to be welded, and also these tips may be replaced with ease by other tips as necessary.

We claim:

1. A resistance welding device for welding a pair of superposed weldable members together at a plurality of welding points disposed in a matrix configuration, said welding device comprising in combination:
   a base structure including vertically separated ceiling and floor members superjacently disposed relative to one another so as to establish therebetween a welding space, said ceiling member at lateral side portions thereof including a first pair of horizontally separated rail members establishing a y-axis;
   an elongated first mounting structure including first mounting means to dependently mount said first mounting structure to said first pair of rail members so that said first mounting structure is disposed transverse to said y-axis yet below said ceiling member, said first mounting means for permitting said first mounting structure to be reciprocally moveable along said first pair of rail members in a direction parallel to said y-axis, said first mounting structure along its longitudinal length including a second pair of horizontally separated rail members establishing an x-axis transversely oriented relative to said y-axis established by said first pair of rail members;
   a pair of electrode gun means each including at least one electrode tip for welding said superposed weldable members at said plurality of matrix-configured welding points;
   second mounting means to dependantly mount each said pair of electrode gun means to said second pair of rail members so that each of said electrode gun means is dependantly supported in said welding space below said first mounting structure, said second mounting means permitting each said pair of electrode gun means to be moveable along said x-axis so as to displacable towards and away from one another; and
   jig truck means movable into and out of said welding space for establishing a platform to support said weldable members in confronting relationship to said at least one electrode tip of each said electrode gun means to thereby permit welding thereby at said matrix-configured welding points.

2. A welding device as in claim 1 wherein each said electrode gun means includes lifting means to vertically displace said at least one electrode tip towards and away from said weldable members.

3. a welding device as in claim 2 wherein each said electrode gun means includes means to permit pivotal movement about a pivot axis parallel to said x-axis.

4. A welding device as in claim 1 wherein said jig truck means includes a pair of jig rails fixed to said floor member, and jig truck mounted to said jig rails for movement therealong.

5. A method for welding a superposed pair of weldable members one to another at a plurality of welding points disposed in a matrix configuration, having a forward row of welding points, by means of a pair of electrode welding guns moveable along transversely oriented x and y axes, said method comprising the sequential steps of:
   (a) positioning said pair of electrode guns in confronting relationship to a centrally located pair of welding points of said forward row;
   (b) operating said electrode guns so as to weld said superposed weldable members together at said centrally located welding points of said forward row;
   (c) simultaneously moving said pair of electrode guns along the y axis until said electrode guns confront a pair of welding points rearward of said pair of welding points of said forward row welded according to step (b);
   (d) operating said electrode guns so as to weld said superposed weldable members together at said rearward pair of welding points;
   (e) displacing said pair of electrode guns away from one another along said x-axis until said electrode guns confront a pair of welding points laterally of said centrally located pair of welding points; and
   (f) operating said electrode guns so as to weld said superposed weldable members together at said rearward pair of welding points.

6. A method as in claim 5 further comprising, subsequent to step (f), the step of:
   (g) repeating steps (e)-(f) until a predetermined number of lateral welding points are welded.

7. A method as in claim 5 wherein step (e) is practiced by also together moving the electrode guns along the y-axis such that said confronted lateral welding points are in said forwarded row.

8. A method as in claim 7 wherein subsequent to step (f) there is practiced the step of:

(g) simultaneously moving said pair of electrode guns along the y-axis until said electrode guns confront a pair of welding points rearward of said lateral welding points and then welding said confronted pair of rearward lateral welding points.

9. A method as in claim 8 wherein step (g) is repeated until a predetermined number of pairs of rearward lateral welding points have been welded.

10. A method for welding a superposed plurality of transversely oriented weldable members one to another, said weldable members establishing a plurality of welding points disposed in a matrix configuration, having a forward row of welding points, by means of a pair of electrode welding guns moveable along transversely oriented x and y axes, said method comprising the sequential steps of:

(a) positioning said pair of guns in confronting relationship to a centrally located pair of welding points of said forward row;

(b) operating said electrode guns so as to weld at least one transverse pair of said superposed weldable member together at said centrally located pair of welding points of said forward row;

(c) simultaneously moving said pair of electrode guns along the y axis until said electrode guns confront a pair of welding points rearward of said pair of welding points of said forward row welded according to step (b);

(d) operating said electrode guns so as to weld said superposed weldable members together at said rearward pair of welding points;

(e) displacing said pair of electrode guns away from one another along said x-axis until said electrode guns confront a pair of welding points laterally of said centrally located pair of welding points; and (f) operating said electrode guns so as to weld said superposed weldable members together at said rearward pair of welding points, whereby other pairs of weldable members are welded together.

11. A method as in claim 10 wherein said weldable members are a plurality of transversely oriented wire members.

* * * * *